Patented Dec. 30, 1930

1,786,842

UNITED STATES PATENT OFFICE

OSCAR HANNACH, OF WILMERSDORF, NEAR BERLIN, GERMANY, ASSIGNOR TO WILHELM KASH, OF WILMERSDORF, NEAR BERLIN, GERMANY

REFRIGERATING COMPOSITION

No Drawing. Application filed June 2, 1926, Serial No. 113,324, and in Germany November 21, 1925.

This invention has reference to improvements in refrigerating compounds, and it refers in particular to refrigerating mixtures containing ammonium-chloride and sodium carbonate as the main constituents, and adapted to produce a great decrease of temperature at low expense and in a very economical and efficient manner. The refrigerant according to this invention among other important advantages is particularly distinguished by its being produced without the use of snow or ice and without the employment of acids. As the best refrigerating mixture of this general kind a mixture has been suggested heretofore consisting of ammonium nitrate and sodium carbonate and water, the compound most generally employed consisting of a mixture of 1 part ammonium-nitrate, 1 part of sodium carbonate and 1 part water. With such previous refrigerating mixtures a drop of temperature of 31 degrees centigrade was obtained, but there was the drawback that this mixture was comparatively expensive, and there was the grave objection that the ammonium nitrate was difficultly obtainable. As a substitute therefor a mixture of ammonium-chloride, saltpeter, Glauber-salt (sodium-sulphate) and water has been proposed; but with this mixture it was only possible to produce a drop of temperature of 25 degrees centigrade, while the price of this mixture was still comparatively high.

Now, it has been ascertained by my experiments that a decrease of temperature from about 30 to 31 degrees centigrade may be obtained by making use according to my invention of a mixture of ammonium-chloride, sodium carbonate and water, while on the other hand ammonium-chloride alone with water will only produce a drop of temperature of 14 degrees C., and sodium-carbonate alone with water produces only a decrease of temperature of 7 degrees centigrade.

The best results are accomplished by employing sodium carbonate in excess relatively to the ammonium-chloride, while the water should be present in excess with relation to the salts. The maximum decrease of temperature was obtained by using a mixture of two parts ammonium-chloride, three parts sodium-carbonate and six parts of water. Of this mixture the amount required costs only about a quarter of the price of the mixture of ammonium-nitrate, sodium-carbonate and water.

For the better illustration of the efficiency of the new refrigerating mixture, I herewith submit a series of tests carried out with the respective mixtures referred to and with the drop of temperature hereinafter mentioned:—

I. 100 parts by weight ammonium chloride, 50 parts by weight sodium carbonate, 300 parts by weight water, drop of temperature of 23°.

II. 100 parts by weight ammonium chloride, 150 parts by weight sodium carbonate, 400 parts by weight water, drop of temperature of 24°.

III. 100 parts by weight ammonium chloride, 100 parts by weight sodium carbonate, 300 parts by weight water, drop of temperature of 27°.

IV. 100 parts by weight ammonium chloride, 100 parts by weight sodium carbonate, 200 parts by weight water, drop of temperature of 29°.

V. 100 parts by weight ammonium chloride, 150 parts by weight sodium carbonate, 300 parts by weight water, drop of temperature of 31°.

VI. 100 parts by weight ammonium chloride, 200 parts by weight sodium carbonate, 300 parts by weight water, drop of temperature of 31°.

VII. 100 parts by weight ammonium chloride, 150 parts by weight sodium carbonate, 200 parts by weight water, drop of temperature of 29°.

The proportions mentioned sub V have been shown to be the most favorable.

According to these proportions from 300 grams ammonium chloride, 450 grams sodium carbonate, 900 grams water, a mixture of altogether 1400 c. c. is obtained showing a decrease of temperature of 31° C. while the known mixture consisting of 550 grams ammonium nitrate, 550 grams sodium carbonate, 550 grams water, yields an amount of 1285 grams and produces a decrease of temperature of 31–32° C.

It should be understood that all these proportions and combinations of ingredients are merely given by way of example, and that the invention is susceptible of modification and changes within the scope of the claims hereinafter submitted.

I claim:—

1. A refrigerating mixture consisting of a mixture of ammonium-chloride with an excess of sodium-carbonate, adapted to produce a decrease of temperature upon being dissolved.

2. A refrigerating composition, consisting of a mixture of ammonium-chloride and sodium-carbonate adapted to produce a decrease of temperature upon being dissolved.

3. A refrigerating composition, consisting of two parts ammonium-chloride and three parts sodium-carbonate adapted to produce a decrease of temperature upon being dissolved.

4. Process for decreasing of the temperature by the application of a freezing or cooling mixture, characterized in that two parts of ammonium-chloride and three parts of sodium-carbonate are dissolved in six parts of water.

In testimony whereof I affix my signature.

Dr. OSCAR HANNACH.